(12) United States Patent
Fattal

(10) Patent No.: US 10,928,564 B2
(45) Date of Patent: Feb. 23, 2021

(54) DIRECTIONAL BACKLIGHT, BACKLIT DISPLAY AND METHOD

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/563,758

(22) Filed: Sep. 6, 2019

(65) Prior Publication Data

US 2019/0391315 A1 Dec. 26, 2019

Related U.S. Application Data

(63) Continuation of application No. PCT/US2018/020544, filed on Mar. 1, 2018.
(Continued)

(51) Int. Cl.
*G02B 5/18* (2006.01)
*F21V 8/00* (2006.01)
*G02B 5/02* (2006.01)

(52) U.S. Cl.
CPC ......... *G02B 5/1819* (2013.01); *G02B 5/0252* (2013.01); *G02B 5/1866* (2013.01);
(Continued)

(58) Field of Classification Search
CPC .......................... G02B 6/0038; G02B 5/1866
See application file for complete search history.

(56) References Cited

U.S. PATENT DOCUMENTS 7,527,416 B2 5/2009 Lin
8,717,676 B2 * 5/2014 Rinko .................. G02B 6/0061
359/571
(Continued)

FOREIGN PATENT DOCUMENTS

CA 2993939 A1 * 3/2017 ......... G02B 27/0172
JP 2004319252 A 11/2004
(Continued)

OTHER PUBLICATIONS

International Search Report and Written Opinion (ISRWO) by International Searching Authority (ISA) Korean Intellectual Property Office (KIPO), dated Jun. 12, 2018 (13 pages) for counterpart PCT Application PCT/US2018/020544.
(Continued)

*Primary Examiner* — Evan P Dzierzynski
*Assistant Examiner* — Keith G. Delahoussaye
(74) *Attorney, Agent, or Firm* — J. Michael Johnson

(57) ABSTRACT

A directional backlight, backlit display and method of directional backlight operation employ diffraction grating to provide emitted light collectively scattered out by diffraction gratings having a uniform intensity and angular spread. The directional backlight includes a light guide configured to guide plurality of guided light beams and a light source configured to provide the guided light beam plurality having the different radial directions. The directional backlight further includes an array of diffraction gratings configured to configured to scatter out a portion of a guided light beam of the guided light beam plurality as emitted light having an intensity and an angular spread that is uniform across the light guide surface. The backlit display further includes an array of light valves configured to modulate the emitted light to provide a displayed image.

21 Claims, 8 Drawing Sheets

Related U.S. Application Data

(60) Provisional application No. 62/476,781, filed on Mar. 25, 2017.

(52) U.S. Cl.
CPC ............. *G02B 6/002* (2013.01); *G02B 6/005* (2013.01); *G02B 6/0021* (2013.01); *G02B 6/0035* (2013.01); *G02B 6/0036* (2013.01); *G02B 6/0038* (2013.01)

(56) References Cited

U.S. PATENT DOCUMENTS

| | | | |
|---|---|---|---|
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 10,484,674 | B2 * | 11/2019 | Fattal ................... G02B 6/0018 |
| 10,578,793 | B2 * | 3/2020 | Baldwin ................ H05B 45/20 |
| 10,684,404 | B2 * | 6/2020 | Fattal ................... G02B 5/1828 |
| 2007/0147079 | A1 | 6/2007 | Wu et al. |
| 2010/0141868 | A1 * | 6/2010 | St. Hilaire ........... G02B 6/0061 349/62 |
| 2014/0043563 | A1 | 2/2014 | Jeon et al. |
| 2015/0316702 | A1 | 11/2015 | Ilmonen et al. |
| 2016/0187556 | A1 | 6/2016 | Bang et al. |
| 2018/0011237 | A1 * | 1/2018 | Fattal ....................... G02B 5/18 |
| 2018/0188441 | A1 | 7/2018 | Fattal |
| 2018/0188691 | A1 | 7/2018 | Fattal |
| 2018/0196194 | A1 * | 7/2018 | Fattal ................... G02F 1/1335 |
| 2018/0299608 | A1 * | 10/2018 | Fattal ................... G02B 6/0036 |
| 2018/0306965 | A1 * | 10/2018 | Fattal ................... G02B 6/0035 |
| 2019/0025494 | A1 | 1/2019 | Fattal et al. |
| 2019/0155105 | A1 * | 5/2019 | Aieta ................... G02B 6/0035 |
| 2019/0317265 | A1 * | 10/2019 | Fattal ..................... G02B 27/42 |
| 2020/0117053 | A1 * | 4/2020 | Fattal ................ G02F 1/133615 |

FOREIGN PATENT DOCUMENTS

| | | |
|---|---|---|
| JP | 2006039041 A | 2/2006 |
| WO | 2016111709 A1 | 7/2016 |
| WO | 2018140063 A1 | 8/2018 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

DIRECTIONAL BACKLIGHT, BACKLIT DISPLAY AND METHOD

CROSS-REFERENCE TO RELATED APPLICATIONS

This application is a continuation patent application of and claims the benefit of priority to International Application No. PCT/US2018/020544, filed Mar. 1, 2018, which claims priority to U.S. Provisional Patent Application Ser. No. 62/476,781, filed Mar. 25, 2017, the entirety of both of which is incorporated by reference herein.

STATEMENT REGARDING FEDERALLY SPONSORED RESEARCH OR DEVELOPMENT

N/A

BACKGROUND

Displays and more particularly 'electronic' displays are a nearly ubiquitous medium for communicating information to users of a wide variety of devices and products. For example, electronic displays may be found in various devices and applications including, but not limited to, mobile telephones (e.g., smart phones), watches, tablet computes, mobile computers (e.g., laptop computers), personal computers and computer monitors, automobile display consoles, camera displays, and various other mobile as well as substantially non-mobile display applications and devices. Electronic displays generally employ a differential pattern of pixel intensity to represent or display an image or similar information that is being communicated. The differential pixel intensity pattern may be provided by reflecting light incident on the display as in the case of passive electronic displays. Alternatively, the electronic display may provide or emit light to provide the differential pixel intensity pattern. Electronic displays that emit light are often referred to as active displays.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
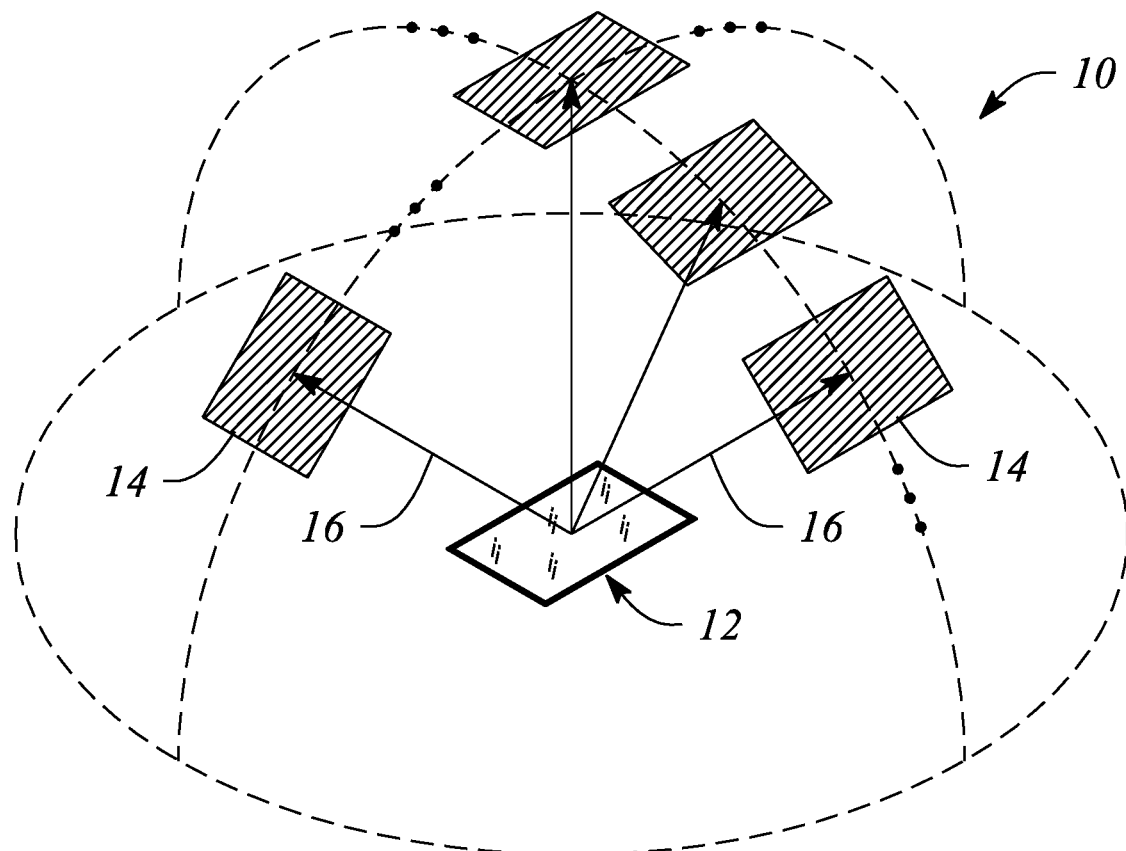
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide directional backlighting as well as a backlit display that uses the directional backlighting to display an image. In particular, embodiments consistent with the principles described herein provide a directional backlight configured to emit light having uniform intensity and angular spread across an extent of the directional backlight. Moreover, the provided directional backlight may employ uncollimated or substantially uncollimated illumination, according to some embodiments. In various embodiments, the directional backlight employs diffraction gratings to provide the emitted light by diffractive scattering. Characteristics of the diffraction grating are configured to determine the intensity and angular spread as well as a principal angular direction of the emitted light. The diffraction grating characteristics are varied as a function a location of the diffraction gratings to provide the uniform intensity and angular spread of the emitted light collectively scattered by the diffraction gratings. The uniform intensity and angular spread of the emitted light may provide a backlight display having uniform brightness over a wide range of viewpoints, for example.

In some embodiments, the backlit display that employs the directional backlight may be a two-dimensional (2D) display and the displayed image is a 2D image. In other embodiments, the backlit display may be a multiview display and the displayed image is a multiview image. When the backlit display is a multiview display, the emitted light may comprise a plurality of directional light beams having different principal angular directions corresponding to respective different view directions of the multiview image.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. Uses of directional backlighting and backlit displays described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. A 2D display may be substantially similar to the multiview display 10, except that the 2D Display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\theta$ is an angle in a horizontal plane (e.g., parallel to the multiview display screen plane).

Figure 1B:
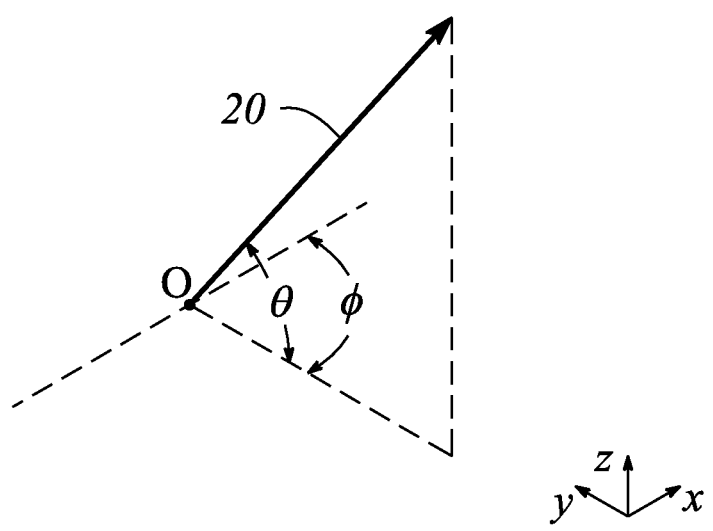
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 18 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each view of a plurality of different views of a multiview display. In particular, a multiview pixel may have an individual pixel corresponding to or representing a view pixel in each of the different views of the multiview image. Moreover, the pixels of the multiview pixel are so-called 'directional pixels' in that each of the pixels is associated with a predetermined view direction of a corresponding one of the different views, by definition herein. Further, according to various examples and embodiments, the different view pixels represented by the pixels of a multiview pixel may have equivalent or at least substantially similar locations or coordinates in each of the different views. For example, a first multiview pixel may have individual pixels corresponding to view pixels located at $\{x_1, y_1\}$ in each of the different views of a multiview image, while a second multiview pixel may have individual pixels corresponding to view pixels located at $\{x_2, y_2\}$ in each of the different views, and so on.

In some embodiments, a number of view pixels in a multiview pixel may be equal to a number of views of the multiview display. For example, the multiview pixel may provide eight (8) view pixels associated with a multiview display having 8 different views. Alternatively, the multiview pixel may provide sixty-four (64) view pixels associated with a multiview display having 64 different views. In another example, the multiview display may provide an eight by four array of views (i.e., 32 views) and the multiview pixel may include thirty-two 32 view pixels (i.e., one for each view). Further, according to some embodiments, a number of multiview pixels of the multiview display may be substantially equal to a number of pixels that make up a selected view of the multiview display.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner having one or more grating spacings between pairs of the features. For example, the diffraction grating may comprise a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example. According to various embodiments and examples, the diffraction grating may be a sub-wavelength grating having a grating spacing or distance between adjacent diffractive features that is less than about a wavelength of light that is to be diffracted by the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure comprising diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

As described further below, a diffraction grating herein may have a grating characteristic, including one or more of a feature spacing or pitch, an orientation and a size (such as a width or length of the diffraction grating). Further, the grating characteristic may selected or chosen to be a function of the angle of incidence of light beams on the diffraction grating, a distance of the diffraction grating from a light source or both. In particular, the grating characteristic of a diffraction grating may be chosen to depend on a relative location of the light source and a location of the diffraction grating, according to some embodiments.

According to various examples described herein, a diffraction grating (e.g., a diffraction grating of a multiview pixel, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where λ is a wavelength of the light, m is a diffraction order, n is an index of retraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}$=1). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2A:
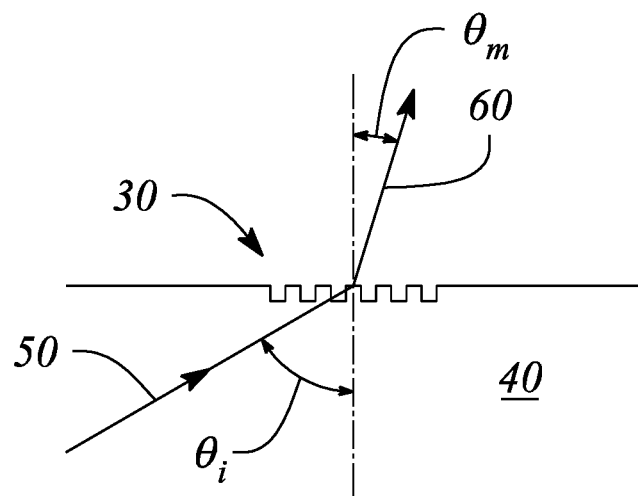
FIG. 2A illustrates a cross-sectional view of a diffraction grating in an example, according to an embodiment consistent with the principles described herein.

FIG. 2A illustrates a cross sectional view of a diffraction grating 30 in an example, according to an embodiment consistent with the principles described herein. For example, the diffraction grating 30 may be located on a surface of a light guide 40. In addition, FIG. 2A illustrates a light beam 50 incident on the diffraction grating 30 at an incident angle $\theta_i$. The incident light beam 50 may be a beam of guided light (i.e., a guided light beam) within the light guide 40. Also illustrated in FIG. 2A is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example diffraction order m=1 (i.e., a first diffraction order).

Herein by definition, a 'slanted' diffraction grating is a diffraction grating with diffractive features having a slant angle relative to a surface normal of a surface of the diffraction grating. According to various embodiments, a slanted diffraction grating may provide unilateral scattering by diffraction of incident light.

Figure 2B:
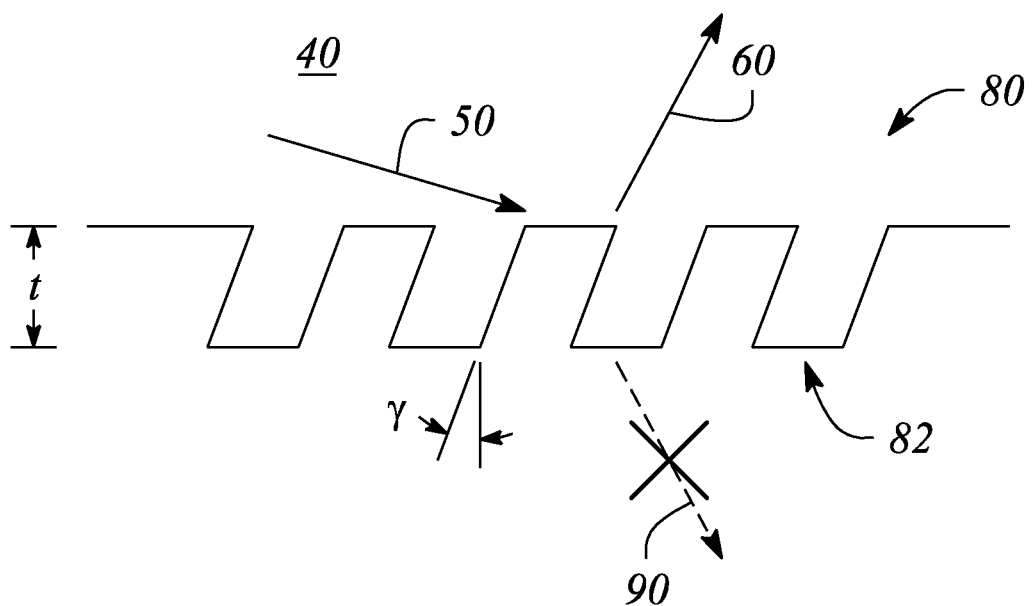
FIG. 2B illustrates a cross-sectional view of a slanted diffraction grating in an example, according to an embodiment consistent with the principles described herein.

FIG. 2B illustrates a cross-sectional view of a slanted diffraction grating 80 in an example, according to an embodiment consistent with the principles described herein. As illustrated, the slanted diffraction grating 80 is a binary diffraction grating located at a surface of a light guide 40, analogous to the diffraction grating 30 illustrated in FIG. 2A. However, the slanted diffraction grating 80 illustrated in FIG. 2B comprises diffractive features 82 having a slant angle $\gamma$ relative to a surface normal (illustrated by a dashed line) along with a grating height, depth or thickness t, as illustrated. Also illustrated are the incident light beam 50 and a directional light beam 60 representing unilateral diffractive scattering of the incident light beam 50 by the slanted diffraction grating 80. Note that diffractive scattering of light in a secondary direction by the slanted diffraction grating 80 is suppressed by the unilateral diffractive scattering, according to various embodiments. In FIG. 2B, 'crossed out' a dashed-line arrow 90 represents suppressed diffractive scattering in the secondary direction by the slanted diffraction grating 80.

According to various embodiments, the slant angle $\gamma$ of the diffractive features 82 may be selected to control a unilateral diffraction characteristic of the slanted diffraction grating 80 including a degree to which diffractive scattering in the secondary direction is suppressed. For example, the slant angle $\gamma$ may be selected to be between about twenty degrees (20°) and about sixty degrees (60°) or between about thirty degrees (30°) and about fifty degrees (50°) or between about forty degrees (40°) and about fifty-five degrees (55°). A slant angle $\gamma$ in a range of about 30°-50° may provide better than about forty times (40×) suppression of the diffractive scattering in secondary direction, when compared to a unilateral direction provided by the slanted diffraction grating 80, for example. According to some embodiments, the thickness t of the diffractive features 82 may be between about one hundred nanometers (100 nm) and about four hundred nanometers (400 nm). For example, the thickness t may be between about one hundred fifty nanometers (150 nm) and about three hundred nanometers (300 nm) for grating periodicities p in a range from about 300 nm and about five hundred nanometers (500 nm).

By definition herein, a 'multibeam element' is a structure or element of a backlight or a display that produces light that includes a plurality of light beams. A 'diffractive' multibeam element is a multibeam element that produces the plurality of light beams by or using diffractive coupling, by definition. In particular, in some embodiments, the diffractive multibeam element may be optically coupled to a light guide of a backlight to provide the plurality of light beams by diffractively coupling out a portion of light guided in the light guide. Further, by definition herein, a diffractive multibeam element comprises a plurality of diffraction gratings within a boundary or extent of the multibeam element. The light beams of the plurality of light beams (or 'light beam plurality') produced by a multibeam element have different principal angular directions from one another, by definition herein. In particular, by definition, a light beam of the light beam plurality has a predetermined principal angular direction that is different from another light beam of the light beam plurality. According to various embodiments, the spacing or grating pitch of diffractive features in the diffraction gratings of the diffractive multibeam element may be sub-wavelength (i.e., less than a wavelength of the guided light).

According to various embodiments, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

Herein, a 'collimated light' or 'collimated light beam' is generally defined as a beam of light in which rays of the light beam are substantially parallel to one another within the light beam (e.g., the guided light beam in the light guide). Further, rays of light that diverge or are scattered from the collimated light beam are not considered to be part of the collimated light beam, by definition herein. Moreover, herein a 'collimator' is defined as substantially any optical device or apparatus that is configured to collimate light.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−a degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, the term 'unilateral' as in 'unilateral diffractive scattering,' and 'unilateral direction,' is defined as meaning 'one-sided' or 'preferentially in one direction' correspond to a first side as opposed to another direction correspond to a second side. In particular, 'unilateral diffractive scattering' is defined as a diffractive scattering that provides or emits light from a first side and not from a second side opposite the first side. For example, unilateral diffractive scattering by a diffraction grating may emit light into a first (e.g., positive) half-space, but not into the corresponding second (e.g., negative) half-space. The first half-space may be above the diffraction grating or a light guide on which the diffraction grating is located and the second half-space may be below the diffraction grating. As such, the unilateral diffractive scattering may emit light into a region or toward a direction that is above the diffraction grating and emit little or no light into another region or toward another direction that is below the diffraction grating, for example. A slanted diffraction grating may provide unilateral diffractive scattering, according to various embodiments described herein.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A diffraction grating is an example of an angle-preserving scattering feature. In contrast, a Lambertian scatterer or a Lambertian reflector as well as a general diffuser (e.g., having or approximating Lambertian scattering) are not angle-preserving scatterers, by definition herein.

Further, as used herein, the article 'a' is intended to have its ordinary meaning in the patent arts, namely 'one or more'. For example, 'a diffraction grating' means one or more diffraction gratings and as such, 'the diffraction grating' means 'the diffraction grating(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
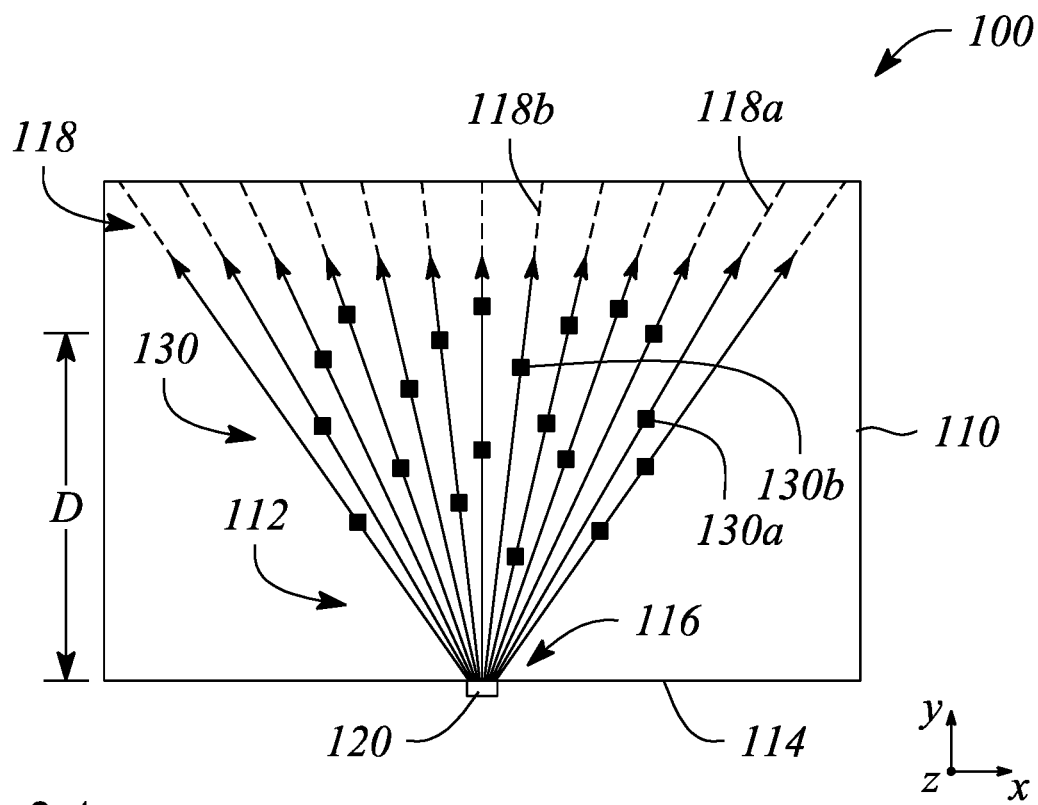
FIG. 3A illustrates a plan view of a directional backlight in an example, according to an embodiment consistent with the principles described herein.
Figure 3B:
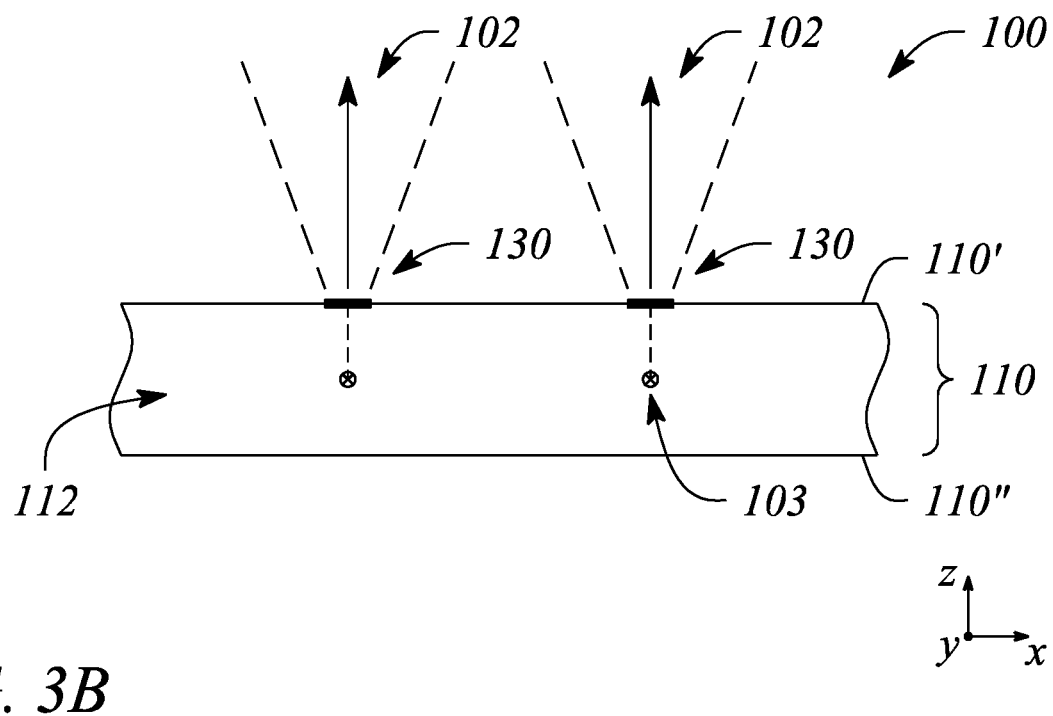
FIG. 3B illustrates a cross-sectional view of a portion of a directional backlight in an example, according to an embodiment consistent with the principles described herein.
Figure 3C:
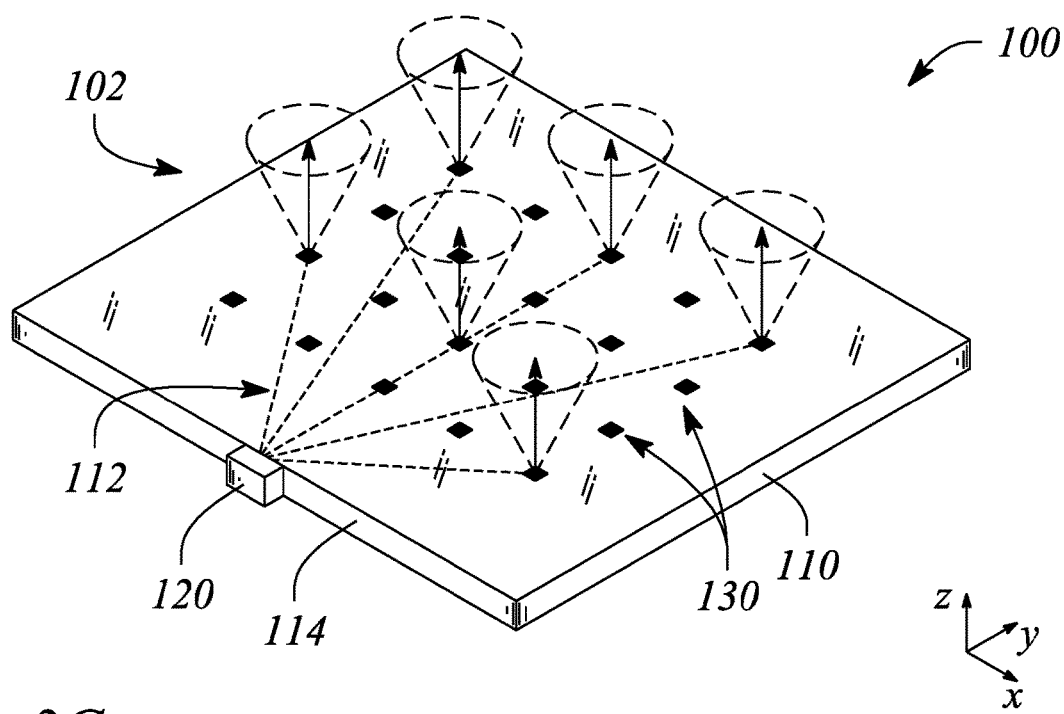
FIG. 3C illustrates a perspective view of a directional backlight in an example, according to an embodiment consistent with the principles described herein.

According to some embodiments of the principles described herein, a directional backlight is provided. The directional backlight is configured to emit light and may be used to illuminate a backlit display, for example. FIG. 3A illustrates a plan view of a directional backlight 100 in an example, according to an embodiment consistent with the principles described herein. FIG. 3B illustrates a cross-sectional view of a portion of a directional backlight 100 in an example, according to an embodiment consistent with the principles described herein. In particular, FIG. 3B may illustrate a cross section through a portion of the directional backlight 100 of FIG. 3A, the cross section being in an x-z plane. FIG. 3C illustrates a perspective view of a directional backlight 100 in an example, according to an embodiment consistent with the principles described herein. According to various embodiments, the illustrated directional backlight 100 may be employed as a backlight for an electronic display (or simply a 'display') configured to display an image. In some of these embodiments, the electronic display may be a multiview display and the displayed image may be a multiview image.

The directional backlight 100 illustrated in FIGS. 3A-3C is configured to provide emitted light 102. Further, the emitted light 102 provided by the directional backlight 100 is configured to have a uniform or at least substantially uniform intensity and angular spread, according to various embodiments. In particular, the intensity and angular spread of the emitted light 102 may be substantially constant regardless of location across the directional backlight 100. The uniform intensity and angular spread of the emitted light 102 may provide uniform brightness across an angular viewing range of a display that employs the directional backlight 100, for example. Further, in at least some embodiments, the angular viewing range may be less than, and in some embodiments much less than, about sixty degrees (60°) in either one direction or in two orthogonal directions parallel to an emission surface or plane of the directional backlight 100.

As illustrated, the directional backlight 100 comprises a light guide 110. The light guide may be a plate light guide (as illustrated), for example. The light guide 110 is configured to guide light along a length of the light guide 110 as guided light or more particularly as a plurality of guided light beams 112. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of guided light beams 112 of the guided light beam plurality according to one or more guided modes of the light guide 110, for example.

In some embodiments, the light guide 110 may be a slab or plate optical waveguide comprising an extended, substantially planar sheet of optically transparent, dielectric material. The substantially planar sheet of dielectric material is configured to guide the guided light beams 112 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

According to various embodiments, the light guide 110 is configured to guide the guided light beams 112 according to total internal reflection at a non-zero propagation angle between a first surface 110' (e.g., a 'front' surface) and a second surface 110" (e.g., a 'back' or 'bottom' surface) of the light guide 110. In particular, the guided light beams 112 propagate by reflecting or 'bouncing' between the first surface 110' and the second surface 110" of the light guide 110 at the non-zero propagation angle. Note, the non-zero propagation angle is not explicitly depicted in FIG. 3B for simplicity of illustration. However, FIG. 3B does illustrate an arrow pointing into a plane of the illustration depicting a general propagation direction 103 of the guided light beams 112 along the light guide length.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light beam 112 may be between about ten degrees (10°) and about fifty degrees (50°) or, in some examples, between about twenty degrees (20°) and about forty degrees (40°), or between about twenty-five degrees (25°) and about thirty-five degrees (35°). For example, the non-zero propagation angle may be about thirty degrees (30°). In other examples, the non-zero propagation angle may be about 20°, or about 25°, or about 35°. Moreover, a specific non-zero propagation angle may be chosen (e.g., arbitrarily) for a particular implementation as long as the specific non-zero propagation angle is chosen to be less than the critical angle of total internal reflection within the light guide 110.

As illustrated in FIGS. 3A and 3C, the directional backlight 100 further comprises a light source 120. The light source 120 is located at an input location 116 on the light guide 110. For example, the light source 120 may be located adjacent to an edge or side 114 of the light guide 110, as illustrated. The light source 120 is configured to provide light within the light guide 110 as the plurality of guided light beams 112. Further, the light source 120 provides the light such that individual guided light beams 112 of the guided light beam plurality have different radial directions 118 from one another.

In particular, light emitted by the light source 120 is configured enter the light guide 110 and then to propagate as the plurality of guided light beams 112 in a radial pattern away from the input location 116 across or along a length of the light guide 110. Further, the individual guided light beams 112 of the guided light beam plurality have different radial directions 118 from one another by virtue of the radial pattern of propagation away from the input location 116. That is, the guided light beams 112 propagate away from a common point of origin (i.e., the light source 120 at the input location 116) at different radial directions 118, as illustrated. For example, the light source 120 may be butt-coupled to the side 114. The light source 120 being butt-coupled may facilitate introduction of light in a fan-shape pattern to provide the different radial directions of the individual guided light beams 112, for example. According to some embodiments, the light source 120 may be or at least approximate a 'point' source of light at the input location 116 such that the guided light beams 112 propagate along the different radial directions 118 (i.e., as the plurality of guided light beams 112).

In some embodiments, the input location 116 of the light source 120 is on a side 114 of the light guide 110 in a vicinity of (e.g., near or approximately at) a center or a middle of the side 114. As illustrated in FIGS. 3A and 3C, the light source 120 is at an input location 116 that is approximately centered on (e.g., at a middle of) the side 114 (i.e., the 'input side') of the light guide 110. Alternatively (not illustrated), the input location 116 may be away from the middle of the side 114 of the light guide 110. For example, the input location 116 may be at a corner of the light guide 110. For example, the light guide 110 may have a rectangular shape (e.g., as illustrated) and the input location 116 of the light source 120 may be at a corner of the rectangular-shaped light guide 110 (e.g., a corner of the input side 114).

Figure 4A:
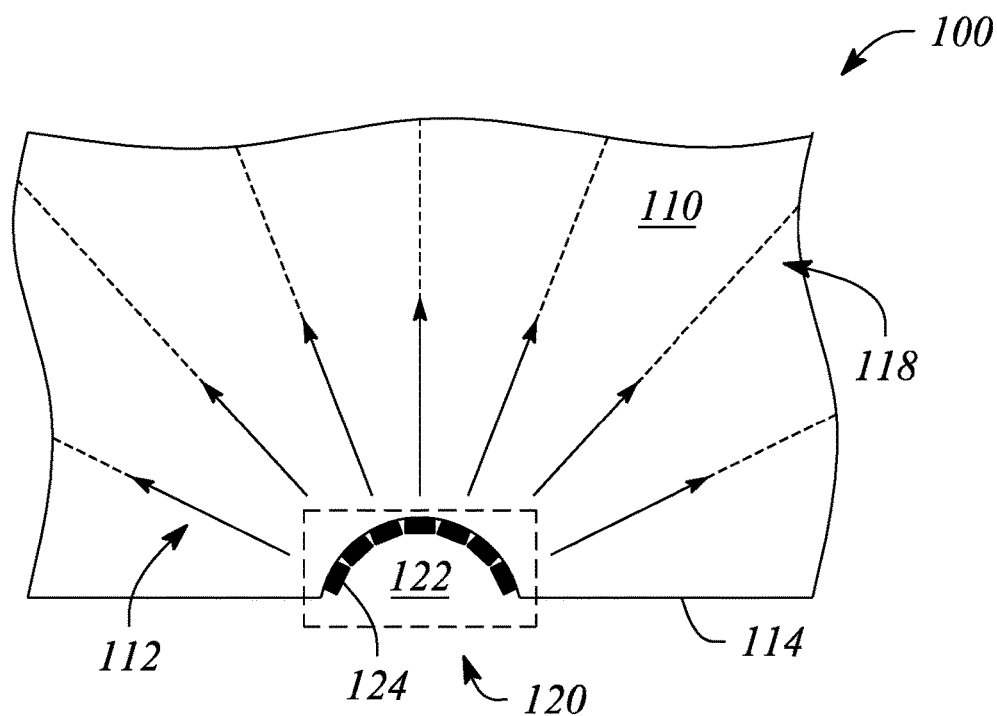
FIG. 4A illustrates a plan view of a portion of the directional backlight in an example, according to an embodiment consistent with the principles described herein.
Figure 4B:
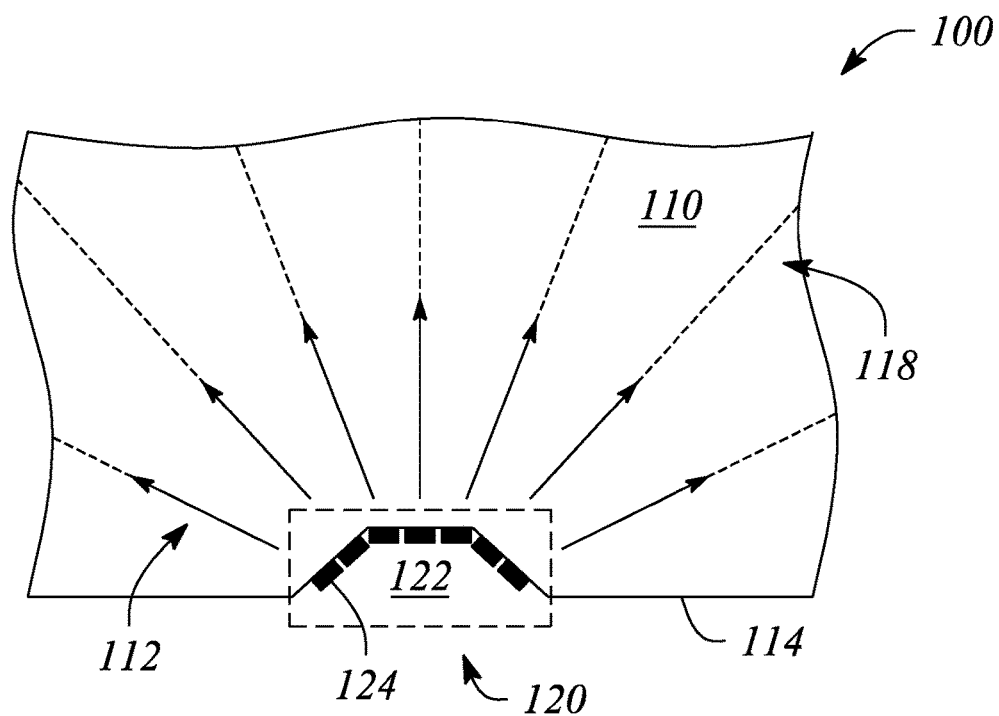
FIG. 4B illustrates a plan view of a portion of the directional backlight in an example, according to another embodiment consistent with the principles described herein.

In some embodiments, the light source 120 may be located in a cavity in a side of the light guide 110. According to various embodiments, the cavity may have a shape configured to spread out or otherwise provide the plurality of guided light beams 112 in the different radial directions 118. FIG. 4A illustrates a plan view of a portion of the directional backlight 100 in an example, according to an embodiment consistent with the principles described herein. FIG. 4B illustrates a plan view of a portion of the directional backlight 100 in an example, according to another embodiment consistent with the principles described herein. In particular, FIGS. 4A-4B illustrate a portion of the directional backlight 100 at the side 114 of the light guide 110 that includes the light source 120. Further, the light source 120 is located in a cavity 122 in the light guide side 114, as illustrated. FIG. 4A illustrates the cavity 122 having a semicircular shape configured to spread out the plurality of guided light beams 112 in the different radial directions 118. FIG. 4B illustrates the cavity 122 having a faceted or piecewise linear cavity shape. Further, in FIGS. 4A and 4B, the light source 120 comprises a plurality of optical emitters 124 distributed along a surface of the cavity 122. FIGS. 4A-4B also illustrate the guided light beams 112 as arrows radiating away from the cavity 122 and light source 120 in the different radial directions 118.

In various embodiments, the light source 120 may comprise substantially any source of light (e.g., optical emitter 124) including, but not limited to, one or more light emitting diodes (LEDs) or a laser (e.g., laser diode). In some embodiments, the light source 120 may comprise an optical emitter 124 configured produce a substantially monochromatic light having a narrowband spectrum denoted by a particular color. In particular, the color of the monochromatic light may be a primary color of a particular color space or color model (e.g., an RGB color model). In other examples, the light source 120 may be a substantially broadband light source configured to provide substantially broadband or polychromatic light. For example, the light source 120 may provide white light. In some embodiments, the light source 120 may comprise a plurality of different optical emitters 124 configured to provide different colors of light. The different optical emitters 124 may be configured to provide light having different, color-specific, non-zero propagation angles of the guided light corresponding to each of the different colors of light.

In some embodiments, guided light beams 112 of the guided light beam plurality produced by coupling light from the light source 120 into the light guide 110 may be uncollimated or at least substantially uncollimated. In other embodiments, the guided light beams 112 may be collimated (i.e., the guided light beams 112 may be collimated light beams), for example in a vertical direction. As such, in some embodiments, the directional backlight 100 may include a collimator (not illustrated) between the light source 120 and the light guide 110. Alternatively, the light source 120 may further comprise a collimator configured to provide collimation in a plane (e.g., a 'vertical' plane) that is substantially perpendicular to the propagation direction of the guided light beams 112. Specifically, the collimation may provide collimated guided light beams 112 having a relatively narrow angular spread in a plane perpendicular to a surface of the light guide 110 (e.g., the first or second surface 110', 110"). According to various embodiments, the collimator may comprise any of a variety of collimators including, but not limited to a lens, a reflector or mirror (e.g., tilted collimating reflector), or a diffraction grating configured to collimate the light, e.g., from the light source 120.

Further, in some embodiments, the collimator may provide collimated light one or both of having the non-zero propagation angle and being collimated according to a predetermined collimation factor. Moreover, when optical emitters of different colors are employed, the collimator may be configured to provide the collimated light having one or both of different, color-specific, non-zero propagation angles and having different color-specific collimation factors. The collimator is further configured to communicate the collimated light to the light guide 110 to propagate as the guided light beams 112, in some embodiments.

Referring again to FIGS. 3A-3C, the directional backlight 100 further comprises an array of diffraction gratings 130 spaced apart from one another on a surface of the light guide 110. In FIGS. 3B and 3C, the diffraction grating array is illustrated on the first surface 110' by way of example and not limitation. According to various embodiments, the array of diffraction gratings 130 is configured to emit or scatter out light as the emitted light 102. In particular, a diffraction grating 130 of the diffraction grating array is configured to scatter out a portion of a guided light beam 112 of the guided light beam plurality as the emitted light 102 having an intensity, a principal angular direction, and an angular spread. In FIGS. 3B and 3C, principal angular direction is illustrated using an arrow and angular spread is illustrated by a pair of dashed lines on either side of the arrow in FIG. 3B. In FIG. 3C, angular spread is depicted using a cone to illustrate a cone angle of the angular spread. Also in FIG. 3C, only select diffraction gratings 130, corresponding guided light beams 112, and the scattered out emitted light 102 are illustrated for ease of illustration and not by way of limitation.

According to various embodiments, individual diffraction gratings 130 of the diffraction grating array generally do not intersect, overlap or otherwise touch one another. That is, each diffraction grating 130 of the diffraction grating array is spaced apart from one another and, as such, each diffraction grating 130 is generally distinct and separated from other ones of the diffraction gratings 130, according to various embodiments.

In various embodiments, each of the diffraction gratings 130 of the diffraction grating array has an associated grating characteristic. The grating characteristic of the diffraction grating 130 is configured to determine the intensity, the principal angular direction, and the angular spread of the emitted light 102 scattered out by the diffraction grating 130. Further, the grating characteristic of the diffraction grating 130 is, in general, a function of both a location of the diffraction grating 130 on the surface of the light guide 110 and a location of the light source 120 on the side 114 of the light guide 110. In particular, the grating characteristic of each diffraction grating 130 depends on, is defined by, or is a function of the radial direction 118 of the guided light beam 112 incident on the diffraction grating 130 from the light source 120. Further, the grating characteristic is determined or defined by a distance between the diffraction grating 130 and the input location 116 of the light source 120, in various embodiments. For example, the grating characteristic may be a function of the distance D between diffraction grating 130a and input location 116 and the radial direction 118a of the guided light beam 112 incident on the diffraction grating 130a, as illustrated in FIG. 3A. Stated differently, a grating characteristic of a diffraction grating 130 in the plurality of the diffraction gratings 130 depends on the input location 116 of the light source and a particular location of the diffraction grating 130 on a surface of the light guide 110 relative to the input location 116 of the light source 120.

FIG. 3A illustrates two different diffraction gratings 130a and 130b having different spatial coordinates $(x_1, y_1)$ and $(x_2, y_2)$, which further have different grating characteristics to compensate or account for the different radial directions 118a and 118b of the plurality of guided light beams 112 from the light source 120 that are incident on the diffraction gratings 130. Similarly, the different grating characteristics of the two different diffraction gratings 130a and 130b account for different distances of the respective diffraction gratings 130a, 130b from the light source input location 116 determined by the different spatial coordinates $(x_1, y_1)$ and $(x_2, y_2)$.

In some embodiments, the grating characteristic comprises a grating depth. The grating depth may be configured to determine the intensity of the emitted light 102 scattered out by the diffraction grating 130. In some embodiments, the grating characteristic comprises one or both of a grating pitch and a grating orientation of the diffraction grating configured to determine a principal angular direction of the emitted light 102 scattered out by the diffraction grating 130. Herein, the grating pitch is equivalent to a spacing of diffractive features of the diffraction grating 130, while the grating orientation is an orientation angle of the diffractive features relative to the radial direction 118 of the guided light beam 112 incident on the diffraction grating 130. In some embodiments, the grating characteristic comprises one or both of a curvature and a grating chirp of the diffraction grating 130 configured to determine the angular spread of the emitted light 102 scattered out by the diffraction grating 130. In some embodiments, the grating characteristic may comprise a combination of more than one of grating depth, grating pitch, grating orientation, grating chirp and a curvature of the diffraction grating 130.

Figure 5:
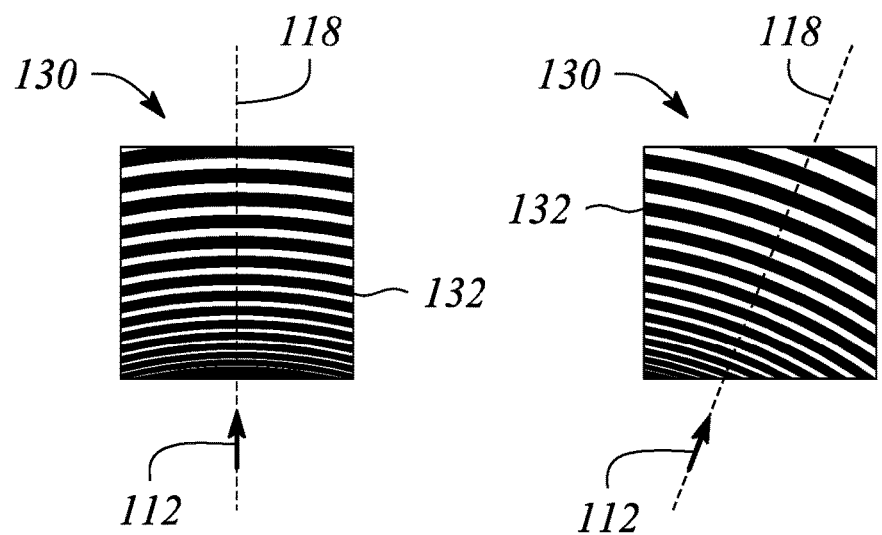
FIG. 5 illustrates plan view of a pair of diffraction grating in an example, according to an embodiment consistent with the principles described herein.

FIG. 5 illustrates plan view of a pair of diffraction gratings 130 in an example, according to an embodiment consistent with the principles described herein. For example, the pair of diffraction gratings 130 in FIG. 5 may be equivalent to the diffraction gratings 130a, 130b illustrated in FIG. 3A. In particular, as illustrated, the pair of diffraction gratings 130 may be located on surface of the light guide 110 and have different grating characteristics. With respect to the different grating characteristics, each diffraction grating 130 of the diffraction grating pair has a curvature and a grating chirp of respective diffractive features 132 thereof, as illustrated. Further, the diffraction gratings 130 have different grating orientations corresponding to different radial directions 118 of incident guided light beams 112, as illustrated. As described above, the different grating characteristics are a function of both a location of the respective diffraction grating 130 of the diffraction grating pair on the surface of the light guide 110 and a location of the light source 120 (not illustrated in FIG. 5) that provides the guided light beams 112, according to various embodiments.

According to some embodiments, the spacing or grating pitch of the diffractive features 132 in the diffraction grating 130 may be sub-wavelength (i.e., less than a wavelength of the guided light beams 112). In some embodiments, the diffraction grating 130 may include a plurality of different gratings or sub-gratings. According to some embodiments, the diffractive features 132 of the diffraction grating 130 may comprise one or both of grooves and ridges that are spaced apart from one another. The grooves or the ridges may comprise a material of the light guide 110, e.g., the groove or ridges may be formed in a surface of the light guide 110. In another example, the grooves or the ridges may be formed from a material other than the light guide material, e.g., a film or a layer of another material on a surface of the light guide 110.

By definition, a 'chirped' diffraction grating is a diffraction grating 130 exhibiting or having a diffraction spacing of the diffractive features 132 (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 6:
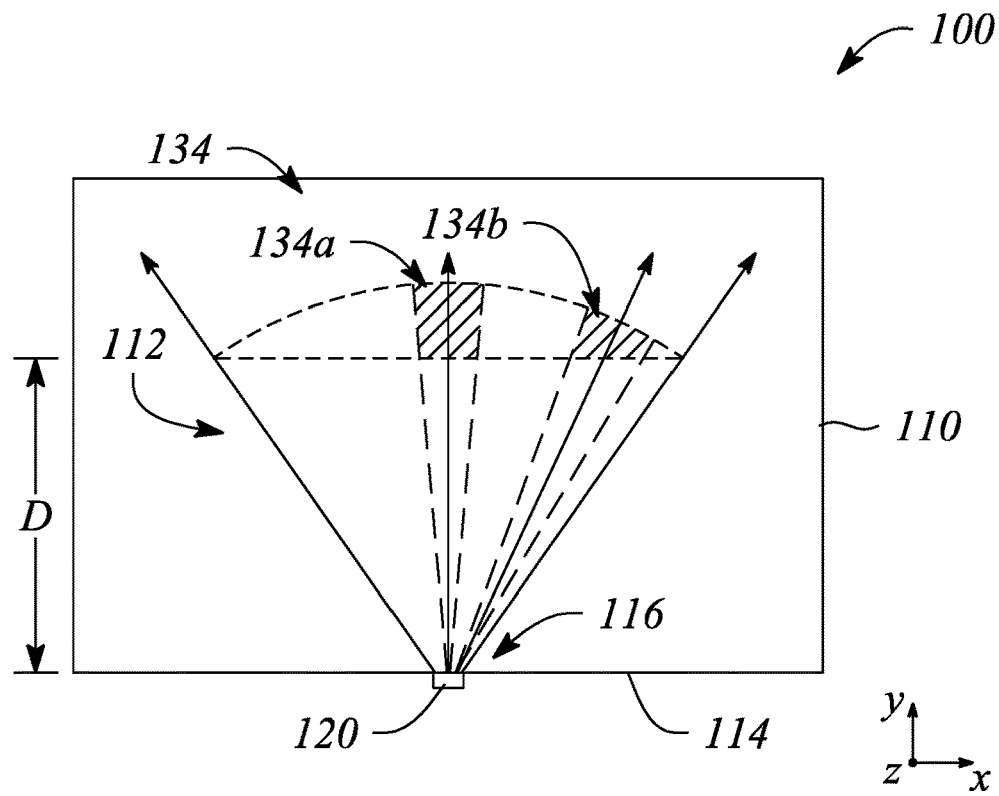
FIG. 6 illustrates a plan view of a directional backlight in an example, according to an embodiment consistent with the principles described herein.

FIG. 6 illustrates a plan view of a directional backlight 100 in an example, according to an embodiment consistent with the principles described herein. In FIG. 6, illumination volumes 134 in an angular space that is a distance D from input location 116 of the light source 120 at the side 114 of the light guide 110 are shown. Note that the illumination volume has a wider angular size as the radial direction of propagation of the plurality of guided light beams 112 changes in angle away from the y-axis and towards the x-axis. For example, illumination volume 134b is wider than illumination volume 134a, as illustrated.

Referring again to FIG. 3B, the array of diffraction gratings 130 may be located at or adjacent to the first surface 110' of the light guide 110, which is the light beam emission surface of the light guide 110, as illustrated. For example, the diffraction gratings 130 may be transmission mode diffraction gratings configured to diffractively scatter out the guided light portion through the first surface 110' as the emitted light 102. Alternatively (not illustrated), the array of diffraction gratings 130 may be located at or adjacent to the second surface 110" opposite from a light beam emission surface of the light guide 110 (i.e., the first surface 110'). In particular, the diffraction gratings 130 may be reflection mode diffraction gratings. As reflection mode diffraction gratings, the diffraction gratings 130 are configured to both diffract the guided light portion and to reflect the diffracted guided light portion toward the first surface 110' to exit through the first surface 110' as the diffractively scattered or emitted light 102. In other embodiments (not illustrated), the diffraction gratings 130 may be located between the surfaces of the light guide 110, e.g., as one or both of a transmission mode diffraction grating and a reflection mode diffraction grating.

In some embodiments, the diffraction gratings 130 of the diffraction grating array are configured to provide unilateral diffractive scattering having a unilateral direction. The unilateral diffractive scattering in the unilateral direction may provide the emitted light 102 preferentially, and in some embodiments exclusively, from or through the first surface 110' as opposed to the second surface 110". In some embodiments, the diffraction grating 130 configured to provide unilateral diffractive scattering comprises a slanted diffraction grating. In other embodiments, the diffraction grating 130 configured to provide unilateral diffractive scattering may be a reflection mode diffraction grating comprising a diffraction grating 130 and a layer of reflective material (not illustrated). The reflective material layer may be positioned on a side of the diffraction grating 130 opposite to which the unilateral diffractive scattering is provided from, the reflective material layer serving as a reflector or mirror, for example.

In some embodiments, provision may be made to mitigate, and in some instances even substantially eliminate, various sources of spurious reflection of guided light beams 112 within the directional backlight 100, especially when those spurious reflection sources may result in emission of unintended direction light beams and, in turn, the production of unintended images in a display that employs the directional backlight 100. Examples of various potential spurious reflection sources include, but not limited to, sidewalls of the light guide 110 that may produce a secondary reflection of the guided light beam 112. Reflection from various spurious reflection sources within the directional backlight 100 may be mitigated by any of a number of methods including, but not limited to absorption and controlled redirection of the spurious reflection.

Figure 7A:
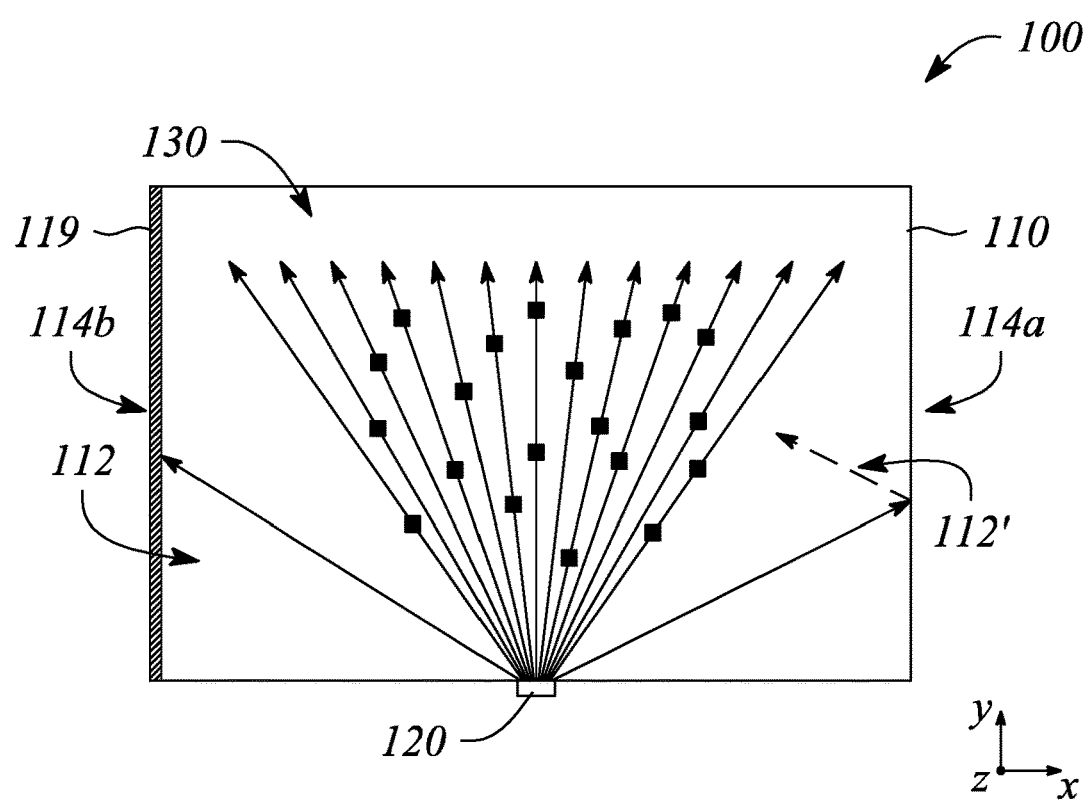
FIG. 7A illustrates a plan view of a directional backlight including spurious reflection mitigation in an example, according to an embodiment consistent with the principles described herein.
Figure 7B:
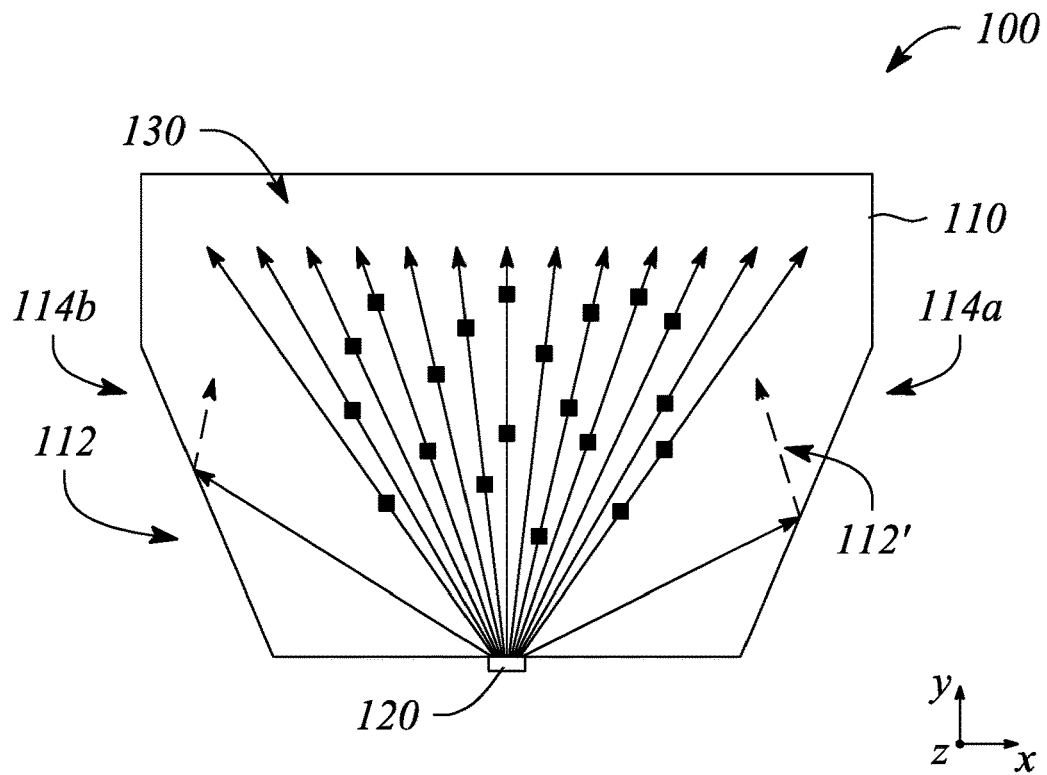
FIG. 7B illustrates a plan view of a directional backlight including spurious reflection mitigation in an example, according to another embodiment consistent with the principles described herein.

FIG. 7A illustrates a plan view of a directional backlight 100 including spurious reflection mitigation in an example, according to an embodiment consistent with the principles described herein. FIG. 7B illustrates a plan view of a directional backlight 100 including spurious reflection mitigation in an example, according to another embodiment consistent with the principles described herein. In particular, FIGS. 7A and 7B illustrate the directional backlight 100 comprising the light guide 110, the light source 120, and the array of diffraction gratings 130. Also illustrated is the plurality of guided light beams 112 with at least one guided light beam 112 of the plurality being incident on a sidewall 114a, 114b of the light guide 110. A potential spurious reflection of the guided light beam 112 by the sidewalls 114a, 114b is illustrated by a dashed arrow representing a reflected guided light beam 112'.

In FIG. 7A, the directional backlight 100 further comprises an absorbing layer 119 at the sidewalls 114a, 114b of the light guide 110. The absorbing layer 119 is configured to absorb incident light from the guided light beams 112. The absorbing layer may comprise substantially any optical absorber including, but not limited to, black paint applied to the sidewalls 114a, 114b for example. As illustrated in 7A, the absorbing layer 119 is applied to sidewall 114b, while the sidewall 114a lacks the absorbing layer 119, by way of example and not limitation. The absorbing layer 119 intercepts and absorbs the incident guided light beam 112 effectively preventing or mitigating the production of the potential spurious reflection from sidewall 114b. On the other hand, guided light beam 112 incident on the sidewall 114a reflects resulting in the production of the reflected guided light beam 112', illustrated by way of example and not limitation.

FIG. 7B illustrates spurious reflection mitigation using controlled reflection angle. In particular, the light guide 110 of the directional backlight 110 illustrated in FIG. 7B comprises slanted sidewalls 114a, 114b. The slanted sidewalls have a slant angle configured to preferentially direct the reflected guided light beam 112' substantially away from the diffraction gratings 130. As such, the reflected guided light beam 112' is not diffractively coupled out of the light guide 110 as an unintended beam of emitted light. The slant angle of the sidewalls 114a, 114b may be in the x-y plane, as illustrated. In other examples (not illustrated), the slant angle of the sidewalls 114a, 114b may be in another plane, e.g., the x-z plane to direct the reflected guided light beam 112' out a top or bottom surface of the light guide 110. Note that FIG. 7B illustrates sidewalls 114a, 114b that include a slant along only a portion of thereof, by way of example and not limitation.

In some embodiments, directional backlight 100 may be transparent or substantially transparent. In particular, the light guide 110 and the spaced apart array of diffraction gratings 130 may allow light to pass through the light guide 110 in a direction that is orthogonal to both the first surface 110' and the second surface 110", in some embodiments. Thus, the light guide 110 and more generally the directional backlight 100 may be transparent to light propagating in the direction orthogonal to the general propagation direction 103 of the guided light beams 112 of the guided light beam plurality. Further, the transparency may be facilitated, at least in part, by the substantially transparency of the diffraction gratings 130.

In accordance with some embodiments of the principles described herein, a backlit display is provided. The backlit display is configured to emit light provided by the backlit display. Further, the emitted light may be modulated by the backlit display to provide or display an image. In some embodiments, the displayed image may be a multiview image and the backlit display may be a multiview display. In some examples, the multiview display is configured to provide or 'display' a 3D image.

Figure 8:
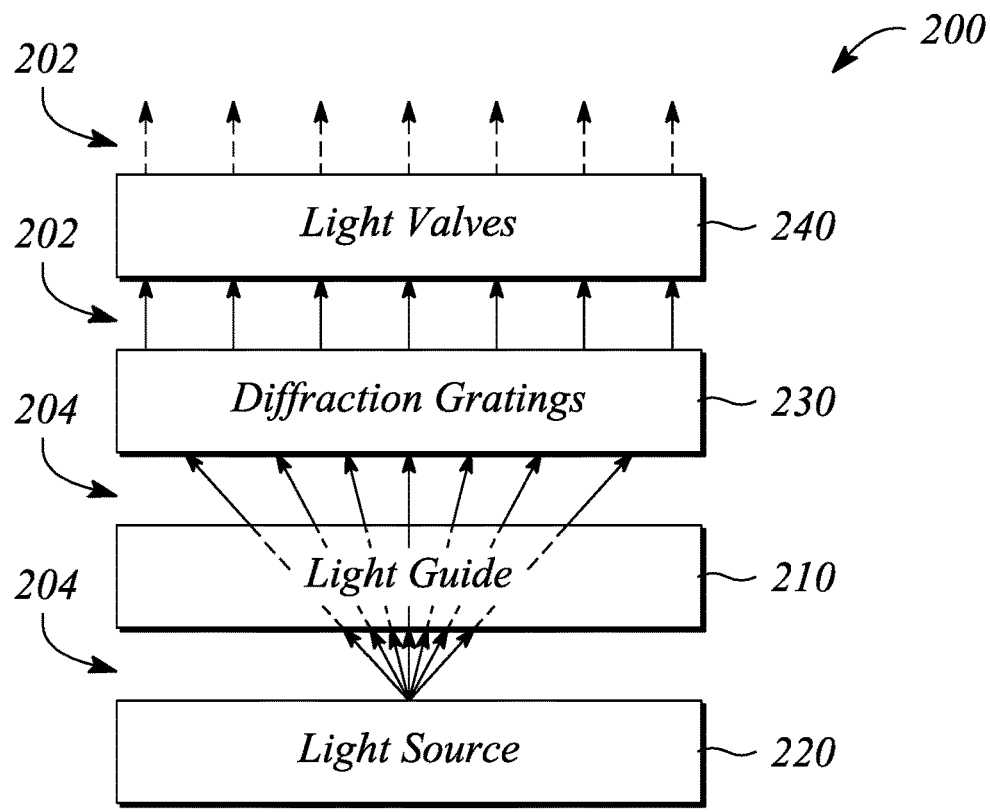
FIG. 8 illustrates a block diagram of a backlit display in an example, according to an embodiment consistent with the principles described herein.

FIG. 8 illustrates a block diagram of a backlit display 200 in an example, according to an embodiment consistent with the principles described herein. According to various embodiments, the backlit display 200 is configured to display or provide a displayed image. In particular, emitted light 202 provided and modulated by the backlit display 200 is used to display the image. The emitted light 202 is illustrated as arrows emanating from the backlit display 200 in FIG. 8.

The backlit display 200 illustrated in FIG. 8 comprises a light guide 210. In some embodiments, the light guide may be substantially similar to the light guide 110 of the directional backlight 100, described above. In particular, the light guide 210 may be a plate light guide, in some embodiments.

Further, as illustrated in FIG. 8, the backlit display 200 comprises a light source 220 located on a side of the light guide 210. The light source 220 is configured to provide a plurality of guided light beams 204 having different radial directions from one another within the light guide 210. In some embodiments, the light source 220 may be substantially similar to the light source 120 described above with respect to the directional backlight 100. In particular, the light source 220 may be located in a vicinity of a middle or center of the light guide side, for example. In some embodiments, the light source 220 may be located in a cavity in the side of the light guide 210. The cavity may have a shape configured to spread out the plurality of guided light beams 204 in the different radial directions. For example, the cavity may have a semicircular shape or a faceted shape. As such, the cavity may be substantially similar to the cavity 122, described above.

The backlit display 200 illustrated in FIG. 8 further comprises an array of diffraction gratings 230 on a surface of the light guide 210. Individual diffraction gratings 230 of the diffraction grating array are configured to scatter out light of the guided light beam plurality as the emitted light 202. In some embodiments, the array of diffraction gratings 230 may be substantially similar to the array of diffraction gratings 130 of the above-described directional backlight 100. In particular, a grating characteristic of an individual diffraction grating 230 of the diffraction grating array is configured to determine an intensity and an angular spread of the emitted light 202. Further, the grating characteristics are a function of both a location of the individual diffraction grating 230 on the light guide surface and the light source location on the side of the light guide 210, according to various embodiments. The grating characteristic may also determine a principal angular direction of the emitted light 202, in some embodiments. According to various embodiments, emitted light 202 collectively scattered out by the individual diffraction gratings 230 is configured to have uniform intensity and angular spread across the light valve array.

In some embodiments, the grating characteristic comprises one or both of a curvature and a grating chirp of the individual diffraction grating 230. The grating characteristic being either or both of the curvature and grating chirp may be configured to determine the angular spread of the emitted light 202 scattered out by the individual diffraction grating 230, for example. Further, in some embodiments, the array of diffraction gratings 230 may be configured to provide unilateral diffractive scattering having a unilateral direction. In these embodiments, the individual diffraction gratings 230 of the diffraction grating array may comprise one or both of a reflection mode diffraction grating (e.g., having a reflective material layer) and a slanted diffraction grating.

According to various embodiments, the backlit display 200 further comprises an array of light valves 240. The array of light valves 240 is configured to modulate the emitted light 202 to provide the displayed image. Dashed lines are used in FIG. 8 to emphasize modulation of the emitted light 202 after passing through the array of light valves 240. In various embodiments, different types of light valves may be employed as the light valves 240 of the light valve array including, but not limited to, one or more of liquid crystal light valves, electrophoretic light valves, and light valves based on electrowetting.

According to some embodiments, the individual diffraction gratings 230 of the diffraction grating array are each configured to scatter out light of the guided light beam plurality as emitted light 202 comprising a plurality of directional light beams having different principal angular directions from one another. In some of these embodiments, the different principal angular directions may correspond to respective different view directions of a multiview image. As such, the backlit display being a multiview display and the displayed image being the multiview image. Further, the individual diffraction gratings 230 may be multibeam elements, while sets of light valves 240 may correspond to multiview pixels of the multiview display. As multibeam elements, the individual diffraction grating 230 may have a size that is between about one half and two times a size of a light valve 240 or equivalently of a center-to-center spacing between light valves 240. Moreover, the individual diffraction grating 230 may have a shape that is analogous to a shape of the multiview pixel, in some embodiments.

Figure 9:
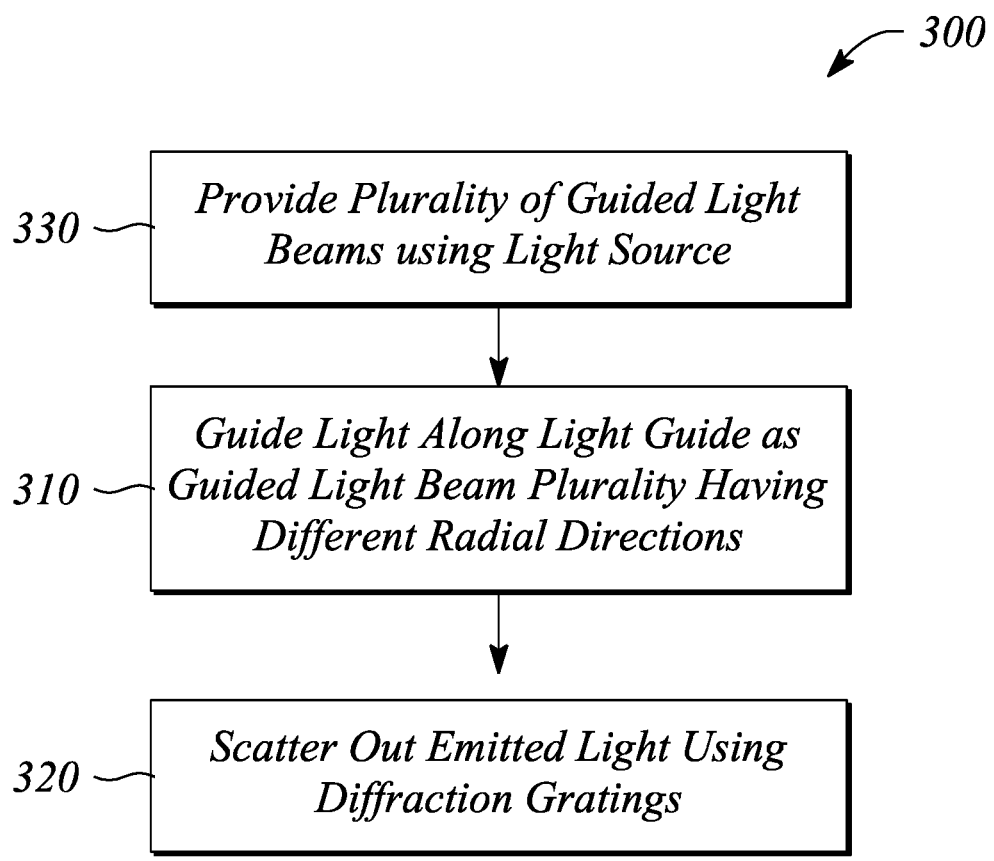
FIG. 9 illustrates a flow chart of a method of directional backlight operation in an example, according to an embodiment consistent with the principles described herein.

In accordance with other embodiments of the principles described herein, a method of directional backlight operation is provided. FIG. 9 illustrates a flow chart of a method 300 of directional backlight operation in an example, according to an embodiment consistent with the principles described herein. The method 300 of directional backlight operation may be used to provide light to illuminate a backlit display and thus display an image, according to various embodiments.

As illustrated in FIG. 9, the method 300 of directional backlight operation comprises guiding 310 the light along the light guide as a plurality of guided light beams having a common point of origin and different radial directions from one another. In particular, a guided light beam of the guided light beam plurality has, by definition, a different radial direction of propagation from another guided light beam of the guided light beam plurality. Further, each of the guided light beams of the guided light beam plurality has, by definition, a common point of origin. The point of origin may be a virtual point of origin (e.g., a point beyond an actual point of origin of the guided light beam), in some embodiments. For example, the point of origin may be outside of the light guide and thus be a virtual point of origin. According to some embodiments, the light guide along which the light is guided 310 as well as the guided light beams that are guided therein may be substantially similar to the light guide 110 and guided light beams 112, respectively, as described above with reference to the directional backlight 100.

The method 300 of directional backlight operation illustrated in FIG. 9 further comprises scattering out 320 light of the guided light beam plurality as emitted light using a diffraction grating of an array of diffraction gratings. The emitted light from the diffraction grating has an intensity and an angular spread that is a function of a location of the diffraction grating relative to the common point of origin of the guided light beam plurality, according to various embodiments. Further, according to various embodiments, emitted light collectively scattered out by the array of diffraction gratings has a uniform intensity and angular spread across a surface of the light guide. In some embodiments, the array of diffraction gratings used in scattering out 320 light may be substantially similar to the array of diffraction gratings 130 of the directional backlight 100, described above. Moreover, the emitted light produced by scattering out 320 may be substantially similar to the emitted light 102, also as described above.

In particular, the emitted light that is scattered out 320 by the array of diffraction gratings has an intensity, a principal angular direction, and an angular spread, according to various embodiments. Each of the intensity, the principal angular direction and the angular spread is controlled or determined by a grating characteristic of a diffraction grating of the diffraction grating array. Further, the grating characteristic is a function of both a location of the diffraction grating on a surface of the light guide surface and the common point of origin of the plurality of guided light beams (e.g., a location of a light source on a side of the light guide). In particular, grating characteristics of the array of diffraction gratings may be varied based on, or equivalently may be a function of, radial directions of incident guided light beams at the diffraction gratings, a distance from the diffraction gratings to the light source that provides the guided light beams, or both.

In some embodiments, scattering out 320 light comprises unilateral diffractive scattering in a unilateral direction. In particular, the diffraction grating of the diffraction grating array may comprise one or both of a slanted diffraction grating and a reflection mode diffraction grating comprising a diffraction grating and a reflective material layer.

As illustrated, the method 300 of directional backlight operation further comprises providing 330 light to be guided as the plurality of guided light beams using the light source. In particular, light is provided to the light guide as the guided light beams having a plurality of different radial directions of propagation using the light source. According to various embodiments, the light source used in providing 330 light is located at a side of the light guide, the light source location being the common origin point of the guided light beam plurality. In some embodiments, the light source may be substantially similar to the light source(s) 120 of the directional backlight 100, described above. For example, the light source may be butt-coupled to an edge or side of the light guide. In another example, the light source may approximate a point source representing the common point of origin. In yet another example, the light source may be located in a cavity on a side of the light guide, the cavity having a shape configured to spread out the plurality of guided light beams in the different radial directions.

In some embodiments, the provided 330 light is substantially uncollimated. In other embodiments, the provided 330 light may be collimated (e.g., the light source may comprise a collimator). In various embodiments, the provided 330 light may be the guided having the different radial directions at a non-zero propagation angle within the light guide between surfaces of the light guide. When collimated within the light guide, the provided 330 light may be collimated according to a collimation factor to establish a predetermined angular spread of the guided light within the light guide. In particular, the collimation and thus the predetermined angular spread provided by the collimation factor may be in a vertical direction.

In some embodiments (not illustrated), the method 300 of directional backlight operation further comprises modulating the emitted light collectively scattered out 320 by the array of diffraction gratings. Modulation may be provided by or using an array of light valves to provide a displayed image. In some embodiments, the array of light valves may be substantially similar to the array of light valves 240 of the above-described backlit display 200. Moreover, in some embodiments, the displayed image may be a multiview image.

Thus, there have been described examples and embodiments of a directional backlight, a backlit display and a method of directional backlight operation having diffraction gratings configured to provide a emitted light having uniform intensity and angular spread. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A directional backlight comprising:
   a light guide configured to guide light beams along a horizontal plane;
   a light source configured to provide within the light guide a plurality of guided light beams in a fan-shaped pattern having different radial directions from one another along the horizontal plane; and
   an array of diffraction gratings spaced apart from one another on a surface of the light guide, a diffraction grating of the diffraction grating array being configured to scatter out a portion of a guided light beam of the guided light beam plurality as emitted light having an intensity, a principal angular direction, and an angular spread,
   wherein emitted light collectively scattered out by diffraction gratings of the diffraction grating array is configured to have a uniform intensity and angular spread across the light guide surface, the emitted light being configured to form a multiview image.

2. The directional backlight of claim 1, wherein the light source is located on a side of the light guide in a vicinity of a midpoint of the side.

3. The directional backlight of claim 1, wherein the light source is located in a cavity in a side of the light guide, the cavity having a shape configured to spread out the plurality of guided light beams in the different radial directions, wherein the light source comprises a plurality of optical emitters distributed along the cavity to generate the plurality of guided light beams in the different radial directions.

4. The directional backlight of claim 1, wherein a grating characteristic of the diffraction grating is configured to determine the intensity, the principal angular direction, and the angular spread of the emitted light scattered out by the diffraction grating, the grating characteristic of the diffraction grating being a function of both a location of the diffraction grating on the surface of the light guide and a location of the light source on a side of the light guide.

5. The directional backlight of claim 4, wherein the grating characteristic comprises a grating depth configured to determine the intensity of the emitted light scattered out by the diffraction grating.

6. The directional backlight of claim 4, wherein the grating characteristic comprises one or both of a grating pitch and a grating orientation of the diffraction grating configured to determine a principal angular direction of the emitted light scattered out by the diffraction grating.

7. The directional backlight of claim 4, wherein the grating characteristic comprises one or both of a curvature and a grating chirp of the diffraction grating, the grating characteristic being configured to determine the angular spread of the emitted light scattered out by the diffraction grating.

8. The directional backlight of claim 1, wherein the diffraction grating is configured to provide unilateral diffractive scattering having a unilateral direction.

9. The directional backlight of claim 8, wherein the diffraction grating configured to provide unilateral diffractive scattering comprises a slanted diffraction grating.

10. The directional backlight of claim 8, wherein the diffraction grating configured to provide unilateral diffractive scattering is a reflection mode diffraction grating comprising a diffraction grating and a layer of reflective material.

11. A backlit display comprising the directional backlight of claim 1, the backlit display further comprising an array of light valves configured to modulate the emitted light to provide a displayed image.

12. A backlit display comprising:
a light guide extending in a horizontal plane;
a single light source located on a side of the light guide, the single light source being configured to provide a plurality of guided light beams having different radial directions from one another within the light guide that radiate from a common point along the horizontal plane;
an array of diffraction gratings on a surface of the light guide, individual diffraction gratings of the diffraction grating array being configured to scatter out light of the guided light beam plurality as emitted light; and
an array of light valves configured to modulate the emitted light to provide a displayed image,
wherein emitted light collectively scattered out by the individual diffraction gratings is configured to have uniform intensity and angular spread across the light valve array, the emitted light forming a multiview image.

13. The backlit display of claim 12, wherein the single light source is located in a cavity in the side of the light guide, the cavity having a shape configured to spread out the plurality of guided light beams in the different radial directions, wherein the single light source comprises a plurality of optical emitters distributed along the cavity to generate the plurality of guided light beams in the different radial directions.

14. The backlit display of claim 12, wherein a grating characteristic of an individual diffraction grating of the diffraction grating array is configured to determine an intensity and an angular spread of the emitted light, the grating characteristic being a function of both a location of the individual diffraction grating on the light guide surface and the single light source location on the side of the light guide.

15. The backlit display of claim 14, wherein the grating characteristic comprises one or both of a curvature and a grating chirp of the individual diffraction grating, the grating characteristic being configured to determine the angular spread of the emitted light scattered out by the individual diffraction grating.

16. The backlit display of claim 12, wherein the array of diffraction gratings is configured to provide unilateral diffractive scattering having a unilateral direction, the individual diffraction gratings of the diffraction grating array comprising one or both of a reflection mode diffraction grating and a slanted diffraction grating.

17. The backlit display of claim 12, wherein the individual diffraction gratings of the diffraction grating array are each configured to scatter out light of the guided light beam plurality as emitted light comprising a plurality of directional light beams having different principal angular directions corresponding to respective different view directions of the multiview image, the backlit display being a multiview display and the displayed image being the multiview image.

18. A method of directional backlight operation, the method comprising:
guiding, in a light guide, a plurality of guided light beams having a common point of origin and different radial directions from one another forming a fan-shaped pattern in a plane that is parallel to the light guide; and
scattering out light of the guided light beam plurality as emitted light using a diffraction grating of an array of diffraction gratings, the emitted light from the diffraction grating having an intensity and an angular spread that is a function of a location of the diffraction grating relative to the common point of origin of the guided light beam plurality,
wherein emitted light collectively scattered out by the array of diffraction gratings has a uniform intensity and angular spread across a surface of the light guide, the emitted light forming a multiview image.

19. The method of directional backlight operation of claim 18, further comprising providing the plurality of guided light beams within the light guide using a light source located in a cavity on a side of the light guide, the cavity having a shape configured to spread out the plurality of guided light beams in the different radial directions.

20. The method of directional backlight operation of claim 18, wherein scattering out light comprises unilateral diffractive scattering in a unilateral direction, the diffraction grating comprising one or both of a slanted diffraction grating and a reflection mode diffraction grating comprising a diffraction grating and a reflective material layer.

21. The method of directional backlight operation of claim 18, further comprising modulating the emitted light collectively scattered out by the array of diffraction gratings using an array of light valves to provide a displayed image.

* * * * *